Figure 1:
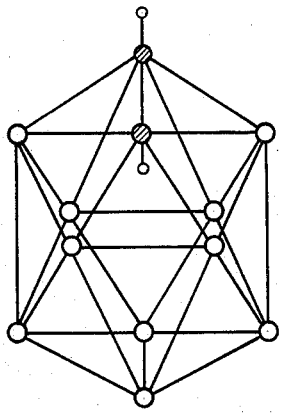

July 12, 1966 T. L. HEYING 3,260,724
ORGANO-BORON-CONTAINING QUATERNARY AMMONIUM COMPOUNDS
AND A PROCESS FOR THEIR PRODUCTION
Filed Jan. 23, 1963

○ BORON

◉ CARBON

∘ HYDROGEN
(HYDROGEN ATOMS ON BORON
OMITTED FOR CLARITY)

*Formula - I*

INVENTOR.
THEODORE L. HEYING
BY *Walter D. Hunter*

AGENT

United States Patent Office 3,260,724
Patented July 12, 1966

3,260,724
ORGANO - BORON - CONTAINING QUATERNARY AMMONIUM COMPOUNDS AND A PROCESS FOR THEIR PRODUCTION
Theodore L. Heying, North Haven, Conn., assignor to Olin Mathieson Chemical Corporation, a corporation of Virginia
Filed Jan. 23, 1963, Ser. No. 254,543
19 Claims. (Cl. 260—295)

This invention relates to novel boron-containing quaternary ammonium compounds and to their preparation. More particularly this invention relates to a preparation of boron-containing quaternary ammonium compounds formed by reacting the compound of the class $$RR'B_{10}H_8[C(COOH)]_2$$

where R and R' are each selected from the class consisting of hydrogen and an alkyl radical containing from 1 to 5 carbon atoms, with ammonia, hydrazine, or a secondary or tertiary alkyl-substituted amine.

The organoboron dicarboxylic acid utilized as a starting material in the process of this invention can be prepared by reacting successively with an alkali metal alkyl or aryl, carbon dioxide, and an aqueous solution of a mineral acid, the compound $RR'B_{10}H_8(CHCH)$, wherein R and R' are each selected from the group consisting of hydrogen and an alkyl radical containing from 1 to 5 carbon atoms as described in application Serial No. 809,569, filed April 28, 1959, now U.S. Patent No. 3,167,584, in the names of John W. Ager, Jr., et al. The compounds of the class $RR'B_{10}H_{10}(CHCH)$ can be conveniently prepared by the reaction of decaborane or an alkylated decaborane having 1 to 2 alkyl groups containing 1 to 5 carbon atoms in each of the alkyl group with acetylene in the presence of a wide variety of ethers, nitriles or amines. Preparation of these compounds is described in application Serial No. 741,976, filed June 13, 1958, now abandoned, of Ager, Heying and Mangold. For example, $$B_{10}H_{10}(CHCH)$$

can be prepared by reacting for 12 hours at 125° C. a mixture of decaborane and tetrahydrofuran in an autoclave pressured to 100 p.s.i. with acetylene.

The preparation of decaborane is known in the art. Lower alkyl decaboranes such as monomethyldecaborane, dimethyldecaborane, monoethyldecaborane, diethyldecaborane, monopropyldecaborane and the like, can be prepared, for example, according to the method described in Altwicker, Garrett, Harris and Weilmuenster U.S. Patent 2,999,117.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with the present invention it was discovered that organoboron quaternary ammonium compounds can be prepared by reacting a compound of the class $RR'B_{10}H_8[C(COOH)]_2$, wherein R and R' are each selected from the class consisting of hydrogen and an alkyl radical containing from 1 to 5 carbon atoms, with ammonia, hydrazine, or a primary or, secondary, or tertiary alkyl-substituted amine in which the alkyl group contains not more than 5 carbon atoms.

In the preferred embodiment of this invention, the nitrogen-containing reactant is added to a solution of the compound $RR'B_{10}H_8[C(COOH)]_2$ is a lower dialkyl ether which can be, for example, diethyl ether. The product, as it is formed, precipitates from the reaction mixture and can be conveniently recovered by filtration. The recovered product is then washed with additional ether and dried.

The temperature of the reaction can be varied widely and generally will be from about −15° C. up to about +50° C. Preferably, the reaction is carried out at room temperature.

The ratio of the reactants can be varied over a wide range of from about 0.5 to about 10 moles of the nitrogen-containing reactant per mole of the compound $$RR'B_{10}H_8[C(COOH)]_2$$

and preferably from about 0.5 to about 3 moles of the nitrogen-containing reactant per mole of the compound $RR'B_{10}H_8[C(COOH)]_2$ employed. Primary amines including methyl amine, isopropyl amine, amyl amine, etc. can be employed in the process of this invention. Useful secondary amines include diethyl amine, dimethyl amine, diisopropyl amine, diamyl amine, etc. Tertiary amines of the type exemplified by trimethyl amine, triethyl amine, tripropyl amine, triisoamyl amine, etc. can also be utilized for the process of this invention.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

This invention is further illustrated in the following examples which are to be considered not limitative.

Example II 5 grams of the compound $B_{10}H_{10}[C(COOH)]_2$ was dissolved in approximately 150 ml. of diethyl ether following which a rapid stream of ammonia was passed through the solution for about 10 minutes. The white precipitate which formed was filtered off, washed with diethyl ether and allowed to dry in air. The yield of the $B_{10}H_{10}[C(COONH_4)]_2$ product was 5.5 grams (96.5 percent of the theoretical yield).

The $B_{10}H_{10}[C(COONH_4)]_2$ product was submitted for analysis and the following results were obtained:

|  | B | C | H |
| --- | --- | --- | --- |
| Calc'd for $B_{10}H_{18}C_2O_4N_2$ | 40.6 | 18.0 | 6.8 |
| Found | 38.7 | 21.9 | 7.2 |
|  | 38.6 | 22.5 | 8.2 |
|  | 37.5 | 22.2 | 6.8 |
|  |  | 22.2 | 7.8 |
|  |  | 24.7 | 8.2 |

Example II

Excess diethylamine was added to a solution of 5.10 grams of $B_{10}H_{10}[C(COOH)]_2$ in about 20 ml. of diethyl ether. A precipitate formed which was removed by filtration. The precipitate so obtained was then washed with diethyl ether and then dried. The yield of product was 5.1 grams M.P. 173°–175° C. The product thus obtained was examined by infrared analysis and shown to be $B_{10}H_{10}[C(COONH_2(C_2H_5)_2)]_2$.

Example III

To 1.0 gram of $B_{10}H_{10}[C(COOH)]_2$ dissolved in about 25 ml. of diethyl ether there was an excess of pyridine. A precipitate formed (plates) which was removed and dried. The product, $B_{10}H_{10}]C(COONHC_5H_5)]_2$ was warmed at 200° C. for 10 minutes in order to remove by sublimation the unreacted $B_{10}H_{10}[C(COOH)]_2$.

Example IV

A quantity of pyridine was added to a solution of $B_{10}H_{10}[C(COOH)]_2$ in diethyl ether. The white precipitate which formed was removed by filtration washed with diethyl ether, and dried. The melting point of the plate-like crystals so obtained was 133° C. By infrared analysis it was determined that the product was $$B_{10}H_{10}[C(COONHC_5H_5)]_2$$

Example V

To a solution of $B_{10}H_{10}[C(COOH)]_2$ dissolved in diethly ether, hydrazine was added. The precipitate which formed was removed from the reaction mixture by filtration, then washed with diethyl ether and dried. The melting point of the compound was found to be 90° C. (with decomposition). By infrared analysis it was determined that the product was $$B_{10}H_{10}[C(COONH_3NH_2)]_2$$

Reference is made to Chemistry Of The Hydrides by Dallas T. Hurd, John Wiley and Sons, Inc., 1952, for a structural representation of the decaborane molecule. The compounds of the instant invention may be considered as structural derivatives of decaborane, but include in addition atoms of carbon, oxygen, and nitrogen.

The compound of the formula $B_{10}H_{10}[C(COONH_4)]_2$ prepared according to Example I has the same structural formula as structural Formula I shown in FIGURE 1 with the exception that the hydrogen atoms indicated by the single and double asterisk are each replaced by the radical —COOHN₄.

The compound of the formula $$B_{10}H_{10}[C(COONH_2(C_2H_5)_2]_2$$

prepared according to Example II has the same structural formula as structural Formula I shown in FIGURE 1 with the exception that the hydrogen atoms indicated by the single and double asterisk are each replaced by the radical —COONH₂(C₂H₅)₂.

The compound of the formula $$B_{10}H_{10}[C(COONHC_5H_5)]_2$$

prepared according to Examples II and IV have the same structural Formula I shown in FIGURE 1 with the exception that the hydrogen atoms indicated by the single and double asterisk are each replaced by the radical —COONHC₅H₅.

The compound of the formula $$B_{10}H_{10}[C(COONH_3NH_2)]_2$$

prepared according to Example V has the same structural Formula I shown in FIGURE 1 with the exception that the hydrogen atoms indicated by the single and double asterisk are each replaced by the radical —COONH₃NH₂.

What is claimed is:

1. A method for the preparation of an amine salt of an organoboron dicarboxylic acid which consists in reacting a compound of the formula $$RR'B_{10}H_8[C(COOH)]_2$$

wherein R and R' are each selected from the class consisting of hydrogen and alkyl of from 1 to 5 carbon atoms, with a material selected from the group consisting of ammonia, pyridine, hydrazine, primary amines of the formula NH₂Rᵃ, wherein Rᵃ is alkyl of not more than 5 carbon atoms, secondary amines of the formula NHR₂ᵇ, wherein Rᵇ is alkyl of not more than 5 carbon atoms, and tertiary amines of the formula NR₃ᶜ, wherein Rᶜ is alkyl of not more than 5 carbon atoms.

2. The process of claim 1 wherein the temperature of the reaction is from about —15° to about +50° C.

3. The process of claim 1 wherein the compound $$RR'B_{10}H_8[C(COOH)]_2$$

is dissolved in a lower dialkyl ether.

4. The process of claim 1 wherein one mole of the compound of the class $RR'B_{10}H_8[C(COOH)]_2$ is reacted with from about 1.0 to about 10 moles of the said material.

5. The method of claim 1 wherein the said compound is $B_{10}H_{10}[C(COOH)]_2$.

6. The method of claim 1 wherein the said material is ammonia.

7. The method of claim 1 wherein the said material is pyridine.

8. The method of claim 1 wherein the said material is hydrazine.

9. The method of claim 1 wherein the said material is a secondary amine of the formula NHR₂ᵇ, wherein Rᵇ is alkyl of from 1 to 5 carbon atoms.

10. The method of claim 1 wherein the said material is NH(C₂H₅)₂.

11. The process for the preparation of the compound $B_{10}H_{10}[C(COONH_4)]_2$ which comprises reacting $$B_{10}H_{10}[C(COOH)]_2$$

with ammonia and recovering the product.

12. The process for the preparation of the compound $B_{10}H_{10}[C(COONH_2(C_2H_5)_2)]_2$ which comprises reacting $B_{10}H_{10}[C(COOH)]_2$ with the NH(C₂H₅)₂ and recovering the product.

13. The process for the preparation of the compound $B_{10}H_{10}[C(COONHC_5H_5)]_2$ which comprises reacting $B_{10}H_{10}[C(COOH)]_2$ with pyridine and recovering the product.

14. The process for the preparation of the compound $B_{10}H_{10}[C(COONH_3NH_2)]_2$ which comprises reacting $B_{10}H_{10}[C(COOH)]_2$ with hydrazine and recovering the product.

15. $RR'B_{10}H_8[C(COOR'')]_2$ wherein R and R' are each selected from the class consisting of hydrogen and alkyl of from 1 to 5 carbon atoms and wherein R'' is selected from the class consisting of —$NH_4$; $NH_3R^a$ wherein $R^a$ is alkyl of from 1 to 5 carbon atoms; $NH_2R_2^b$, wherein $R^b$ is alkyl of from 1 to 5 carbon atoms; —$NHR_3^b$, wherein $R^b$ is alkyl of from 1 to 5 carbon atoms; —$NHC_5H_5$ and —$NH_3NH_2$.

16. $B_{10}H_{10}[C(COONH_4)]_2$.
17. $B_{10}H_{10}[C(COONH_2(C_2H_5)_2)]_2$.
18. $B_{10}H_{10}[C(COONHC_5H_5)]_2$.
19. $B_{10}H_{10}[C(COONH_3NH_2)]_2$.

References Cited by the Examiner
UNITED STATES PATENTS 3,051,546   8/1962   Miller _____ 260—501

WALTER A. MODANCE, *Primary Examiner.*

NICHOLAS S. RIZZO, *Examiner.*

R. T. BOND, *Assistant Examiner.*

UNITED STATES PATENT OFFICE
CERTIFICATE OF CORRECTION

Patent No. 3,260,724                     July 12, 1966

Theodore L. Heying

It is hereby certified that error appears in the above numbered patent requiring correction and that the said Letters Patent should read as corrected below.

Column 3, line 70, for "$COOHN_4$" read -- $COONH_4$ --; column 4, line 7, for "Examples II and IV" read -- Examples III and IV --.

Signed and sealed this 1st day of August 1967.

(SEAL)
Attest:

Edward M. Fletcher, Jr.                     EDWARD J. BRENNER
Attesting Officer                            Commissioner of Patents